UNITED STATES PATENT OFFICE.

FRANCIS ELLERSHAUSEN AND RICHARD WALSINGHAM WESTERN, OF LONDON, ENGLAND.

TREATMENT OF ZINC ORES.

SPECIFICATION forming part of Letters Patent No. 715,771, dated December 16, 1902.

Application filed August 4, 1902. Serial No. 118,405. (No specimens.)

*To all whom it may concern:*

Be it known that we, FRANCIS ELLERSHAUSEN, residing at 32 Rochester road, Camden Town, London, and RICHARD WALSINGHAM WESTERN, residing at 20 Bucklersbury, London, England, subjects of the King of Great Britain, have invented new and useful Improvements in the Treatment of Zinc Ore and other Zinkiferous Matter, Whether Containing Cadmium or Otherwise, of which the following is a specification.

Our invention relates to the treatment of blende (sulfid-of-zinc ores) and calamin, (carbonate-of-zinc ores,) whether containing cadmium or otherwise; also, to the treatment of the solids of fumes, tailings, and like products of other metallurgical processes for the purpose of obtaining metallic zinc and cadmium or the merchantable compounds of these metals. It is well known that such ores and material may be treated with acids for the purpose of obtaining their metallic contents in solution and that such contents may subsequently be precipitated by manifold reagents—such as carbonates, sulfids, or hydroxids—and that these precipitates may in certain cases be suitable for smelting or for use as pigments in the manufacture of paint. If, however, it is intended to produce zinc oxid of good quality, the best precipitant is aqueous ammonia. Our invention relates to an improved procedure in the use of this reagent which is also applicable to caustic soda or caustic-potash solution and their chemical equivalents, where these can be used with advantage. In any treatment of zinkiferous matter with acid for such purposes water must be added or a crystallization sets in and stays further chemical action. Water is also required to wash out the metallic compounds formed. If pure water be used, it must subsequently be separated from the valuable substances dissolving in it at considerable inconvenience and expense. The effect of the operations as hereinafter described is to make use of the liquor from which the zinc has been precipitated to supply the water required for this purpose, so that no such subsequent separation is needed.

According to our invention the ore or other product after calcination is treated with a dilute solution of hydric ammonic sulfate prepared by adding sulfuric acid, advantageously commercial and of strength about 144° Twaddell, to a solution of ammonium sulfate, which latter is advantageously kept in a suitable reservoir at a strength of from four to ten per cent., or instead of adding the sulfuric acid to the ammonium sulfate before heating the calcined ore therewith we may proceed as follows—that is to say, we may wet the said ore with the ammonium-sulfate solution and then add the sulfuric acid. In the case of calamin ores and certain fumes previous calcination is not necessary, though it is preferable, and the carbonic-acid gas contained in the calamin may be collected for use in other manufacturing operations. In the case of blende ores and certain tailings it is desirable to calcine at a low temperature, so that as much zinc sulfate as possible is formed, thus reducing the amount of hydric ammonic sulfate required, and therefore the quantity of sulfuric acid necessary for preparing it. The quantity of hydric ammonic sulfate which it is necessary to add to a given charge of ore should be calculated so as to provide just sufficient unsatisfied sulfuric acid for the solution of all the zinc, cadmium, and any of the alkaline metals that may be present and to combine with any of the alkaline earths present in a condition easily acted on. The supernatant liquid is then drawn off and the residue washed with ammonium-sulfate solution. As much of this should be allowed to drain away as possible, and the separation of the liquor may be expedited and completed in case of necessity by the use of a centrifugal separator. The liquors resulting from this lixiviation and washing may be mixed. They are filtered through a layer of calcium carbonate (or agitated with a small quantity of this substance in a fine state of division) and after being allowed to stand in order that any particles in suspension may have time to settle are drawn off into another receptacle. The liquor will now contain zinc sulfate and cadmium sulfate (if the latter metal was present in the ore) or the double compounds of these metals with ammonia, and it is advantageously agitated with zinc-dust or run through boxes containing zinc-turnings, as in the well-known operation for depositing gold from cyanid solutions. The zinc-dust or zinc-turnings are then treated by ordinary methods for the production of cadmium as metal or pigment. If one of the ordinary varieties of zinc ore is under treatment, the liquor is now free from any impurities which would be detrimental to the quality of zinc-white to be obtained from it by precipitation. Should such impurities still be present and not capable of being got rid of by the ordinary expedients of commercial chemistry, it may be better that our process should be applied for the production of metallic zinc rather than the pigment zinc-white. To the liquor obtained and purified as above described we add a solution of ammonia (advantageously prepared in a manner hereinafter described from the stock solution of ammonium sulfate) as nearly as possible sufficient in amount to completely precipitate the whole of the zinc in it. The precipitate formed consists of zinc hydroxid. This is advantageously drained in a filter-press, and then after removing the remaining water, including that in chemical combination in a suitable furnace, it is ready for sale as a commercial pigment or for smelting to obtain metallic zinc. The solution of ammonia is advantageously prepared from the stock solution of ammonium sulfate by drawing off the requisite quantity into another reservoir or tank, agitating with it a sufficient quantity of slaked lime, and allowing the mixture to stand until the gypsum produced has subsided, when the supernatant solution of ammonia can be drawn off clear. The stock solution of sulfate of ammonia being dilute, there will be little loss of ammonia in this operation unless the ammonia solution is to be kept some considerable time, when a film of mineral oil upon the surface will suffice to restrict the escape of ammonia by diffusion or evaporation. The liquor from which the zinc hydroxid has been precipitated contains sulfate of ammonium and should be returned to the reservoir containing the stock of that solution. The level in this reservoir should be kept up when necessary by using a sufficient quantity of fresh water to wash out (in a filter-press, if necessary) the remnants of zinc and ammonium sulfates from the discarded gangue of the ore and ammonium-sulfate from the zinc precipitate or gypsum produced in the preparation of the ammonia solution. If it be found desirable to use more water than as aforesaid for the purpose of washing the residues, the amount of the stock solution will tend to increase. This difficulty may be removed by encouraging evaporation in and between the operations described and applying heat (if necessary) to this end or by applying heat to separate ammonia-gas from part of the aqueous ammonia prepared in the manner described, the gas being led off to be reabsorbed by other portions of aqueous ammonia and the exhausted liquor being rejected; but the advantage of the process described is that whatever the class of ore treated the volume of fluid in the system—i. e., circulating from operation to operation—remains practically the same or may be kept constant with little recourse, if any, to such devices as those just enumerated.

In cases where the purity of the zinc-white is not important sodium or potassium sulfate may be used in lieu of the ammonia compound, as above described; but in such cases the stock solution should be made much weaker.

Our process possesses the advantage that the amount of water in the circulating liquor can be maintained practically constant, as the ingress of water contained in the sulfuric acid, &c., used and from the washings may be counterbalanced by the amount removed by evaporation and as water of hydration of the zinc hydrate and gypsum, this feature being of great commercial importance.

Having now particularly described and ascertained the nature of our said invention and in what manner the same is to be performed, we declare that what we claim is—

1. In the treatment of zinc ores and other zinkiferous matter wherein aqueous ammonia is used as a precipitant, the provision of chemical means whereby the quantity of water in the system is maintained practically constant, substantially as, and for the purpose, hereinbefore described.

2. The process for the treatment of zinc ores and other zinkiferous matter, consisting in acting upon the said ore or other matter with hydric ammonic sulfate in solution, in treating the double sulfate of ammonium and zinc formed with aqueous ammonia and in subjecting the hydroxid precipitated to heat, substantially as hereinbefore described.

3. The process for the treatment of zinc ores and other zinkiferous matter, consisting in calcining where necessary, wetting with a dilute solution of ammonium sulfate, adding sulfuric acid, washing with ammonium sulfate and precipitating with aqueous ammonia and heating the precipitate, substantially as hereinbefore described.

4. The process for the treatment of zinc ores and other zinkiferous matter, consisting in acting upon the said ore or other matter with hydric ammonic sulfate in solution to produce double sulfate of ammonia and zinc, agitating ammonium sulfate with slaked lime, drawing off the supernatant solution of ammonia, and treating the double sulfate of ammonia and zinc previously formed, with said ammonia solution to precipitate the hydroxid of zinc, substantially as described.

5. A process for the treatment of zinc ores and other zinkiferous matter containing cadmium, consisting in reacting upon the same with hydric ammonic sulfate, washing with ammonium sulfate and treating the liquor with zinc in a finely-divided condition, for the separation of cadmium, substantially as described.

FRANCIS ELLERSHAUSEN.
RICHARD WALSINGHAM WESTERN.

Witnesses:
JOHN E. BOUSFIELD,
A. ALBRETT.